Nov. 14, 1950  E. E. MALLORY ET AL  2,529,509
UNDERPLY TURNDOWN AND STITCHING DEVICE
Filed April 29, 1947
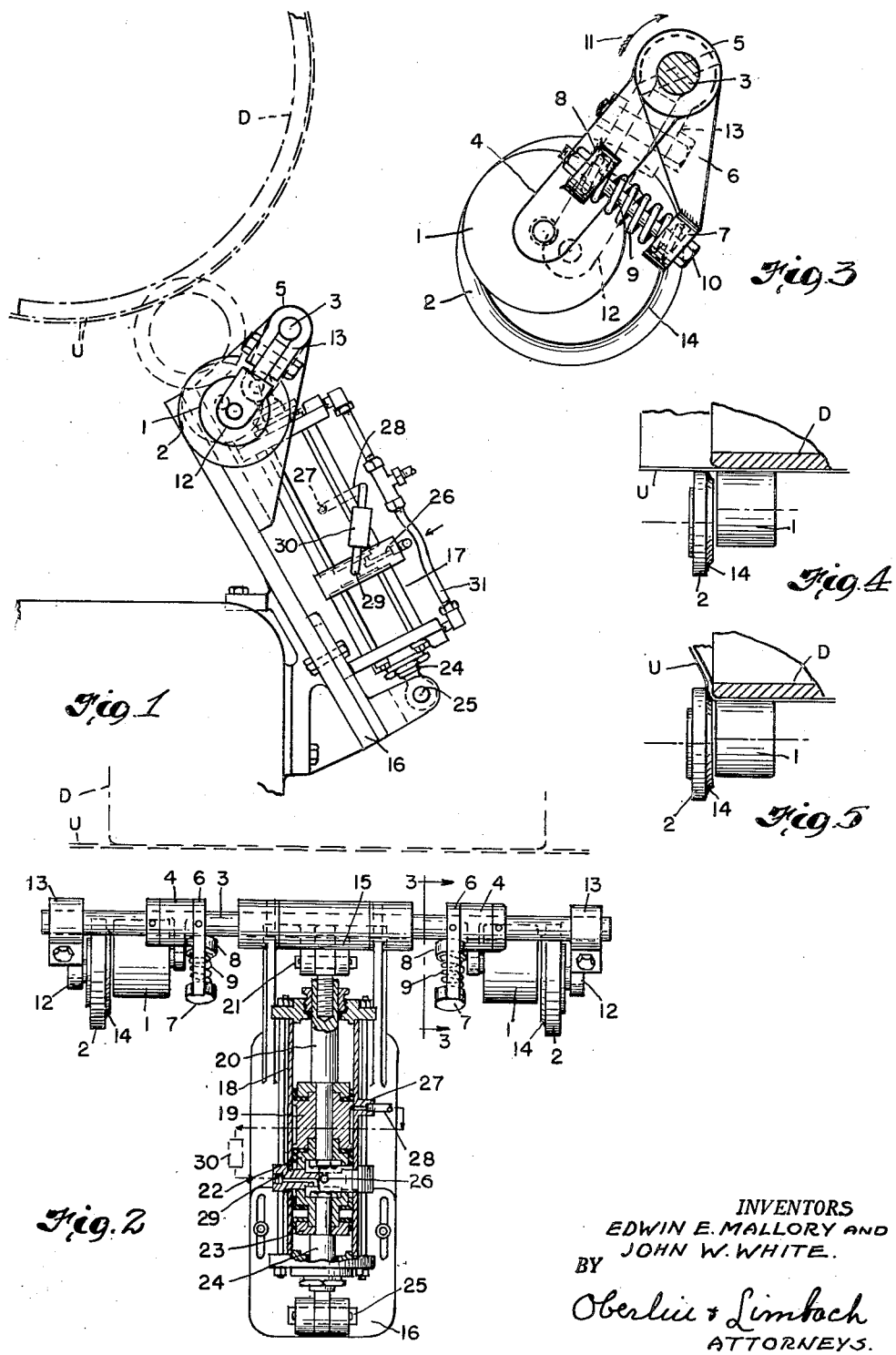
INVENTORS
EDWIN E. MALLORY AND
JOHN W. WHITE.
BY
Oberlin & Limbach
ATTORNEYS.

Patented Nov. 14, 1950

2,529,509

UNITED STATES PATENT OFFICE 2,529,509

UNDERPLY TURNDOWN AND STITCHING DEVICE

Edwin E. Mallory, Cuyahoga Falls, and John W. White, Wadsworth, Ohio, assignors to National Rubber Machinery Company, Akron, Ohio, a corporation of Ohio Application April 29, 1947, Serial No. 744,736

12 Claims. (Cl. 154—10)

This invention relates to an underply turn down and stitching device for tire building machines in which tire carcasses are built up on a rotatable forming drum by successive applications of strips of ply material on the periphery of the drum in superimposed relation to each other.

As is well known in the art, the strips of ply material which are first applied to the periphery of the drum are known as the "underply" and are positioned with their margins overhanging the ends of the drum so that the margins can be "turned down," that is turned radially inwardly of the drum at the drum ends to permit the application of bead cores readily to the outer periphery of the underply at the ends of the drum preparatory to the subsequent step of turning up the underply about the bead cores to incorporate the cores in the carcass. It is desirable that the outer peripheral underply surface which is to receive the bead core be as smooth and free from wrinkles as possible and well compacted preparatory to the application of the bead core thereto.

One of the principal objects of the present invention is to provide a simple and efficient underply turndown device for turning down the overhanging under ply at the drum ends in a manner such that the under ply is uniformly compacted and free from wrinkles at the areas which are to receive the bead cores.

A more specific object is to hold down and compress or "stitch" the underply at the peripheral margins of the drum concurrently with the turning down of the overhanging under ply and at substantially the same location angularly of the drum axis.

Another specific object is to provide an underply turn down device in which a hold down element or roller and a turn down element or roller are arranged in substantially face to face relation to each other, endwise of the drum, with their axis parallel and very close together when they are in operative positions so that they operate simultaneously on the ply at the same location circumferentially of the drum axis to compact and turn down the underply and provide thereon a uniformly smooth and accurate surface for receiving the bead core.

Other objects and advantages will become apparent from the following description wherein reference is made to the drawings in which—

Fig. 1 is an end elevation of the ply turn down device of the present invention, the forming drum and its relation to the device being shown diagrammatically;

Fig. 2 is a front elevation of the device and drum illustrated in Fig. 1;

Fig. 3 is a sectional view of the device taken on line 3—3 of Fig. 2; and,

Figs. 4 and 5 are diagrammatic illustrations of the hold down and turn down rollers of the device showing them in the initial and final operative positions respectively.

Referring to the drawings, the device is shown in connection with a forming drum D on which underply U has been applied with its margins overhanging the end of the drum D. The device comprises a hold down element such as the roller 1 which in operative position is adapted to roll against the outer periphery of the underply adjacent to the end of the forming drum D and a turn down element such as the roller 2 which is adapted to move past the end of the drum D for turning down the overhanging margin of the underply while the roller 1 is being pressed against the periphery of the underply at the margin of the drum.

In general, in the building of tire carcasses the bead cores are applied at both ends of the drum simultaneously and for this purpose, two sets of elements or rollers 1 and 2 are employed and arranged, one set at each end of the drum. Since both sets are identical in form and function only one is described in detail. Both sets are mounted, however, on a common rock shaft 3 which provides a movable suport for moving them into and out of operative position with respect to the drum D consequent upon rocking of the shaft 3.

In the form of the device illustrated, the roller 1 is mounted on a suitable arm 4 with its axis generally parallel to the axis of the shaft 3. The arm 4 in turn is provided with a hub 5 which in turn is mounted on the shaft 3 for swinging movement thereabout but in fixed position axially thereof. Mounted on the shaft 3 in fixed position relative thereto is an arm 6 having an abutment 7 at one end. Interposed between a suitable abutment 8 on the arm 4 and the abutment 7 is a compression spring 9 which normally urges the arm 4 about the shaft 5 to an initial operating position.

A suitable tie bolt 10 is provided to limit the movement of the arm 4 relative to the shaft 3. In the form illustrated the shaft 3 is adapted to be rotated in a clockwise direction as indicated by the arrow 11 for applying the roller 1 to the peripheral surface of the drum. As a result the roller 1 can be moved to an initial operating position against the drum through the medium of the spring 9 and arm 4. Upon continued rocking of the shaft 3 in the same direction the pressure applied to the roller 1 can be increased without additional movement of the roller and thus it is held in final operating position by a resilient lost motion connection. The roller 2 in turn is mounted on a suitable arm 12 having a hub 13 which is secured to the shaft 3 in fixed position axially of the shaft and for rotation therewith. The parts described are so arranged that the rollers 1 and 2 normally occupy the position such as illustrated in Fig. 3 in which they are in substantially face to face relation endwise of the drum and if extended axially would be substantially tangential with each other at the line of initial contact of the roller 1 with the drum. Accordingly, by rocking the shaft 3 clockwise as indicated by the arrow 11, the roller 1 is first brought into contact with the ply material on the margin of the drum this being its initial operating position. Continued rotation of the shaft 3 in the same direction increases the contact pressure between the roller 1 and the ply material, taking up the lost motion provided by the spring 9 and concurrently moving the roller 2 past the end of the drum so as to turn down the overhanging portion of the ply material. It is important to note that in all operating positions of the rollers 1 and 2 the rollers are substantially face to face endwise of the drum and their axes are parallel and closely adjacent to each other. As a result the ply material is being held and concurrently turned down at substantially the same position angularly about the axis of the drum so that the stress on the ply fabric at any instant is confined to a very narrow area circumferentially of the drum. Accordingly the danger of tearing of the material is reduced, wrinkles are eliminated and a uniform smooth bead core receiving surface is provided on the outer periphery of the underply. If desired, the roller 2 may have a slight undercut or shoulder 14 on its inner face adjacent to the outer face of the roller 1 so that when it is in final operating position the shoulder 14 can form a rounded and smooth juncture between that part of the underply which is on the periphery of the drum and that part which is turned down or folded at the end of the drum.

It is desirable that the rollers occupy an idle or inoperative position in spaced relation to the drum as illustrated in Fig. 1 and for well known reasons this position should be one in which the rollers are a substantial distance from the drum. Since the movement of the roller 2 past the end of the drum must be relatively slow, considerable time would elapse if the same speed of movement were employed in moving the rollers from idle to initial operating position. In order to move the rollers relatively rapidly from idle to initial operating position and more slowly from initial to final operating position, a suitable power means is provided and is connected to the rock shaft 3 so as to rock it at different speeds. Mounted on the shaft 3 is a suitable yoke 15 which is secured to the shaft for rotation or rocking therewith. Mounted on a suitable frame 16 which is secured to the frame work of the entire building machine is a floating piston and cylinder assembly indicated generally at 17. The piston and cylinder assembly comprises a cylinder 18 in one end of which is a piston 19 having a piston rod 20 which is pivotally connected at its outer end to the yoke 15 by means of a pivot 21. The cylinder 18 has a partition wall 22 dividing it into two separate chambers in one of which the piston 19 operates. In the other chamber is a piston 23 having a piston rod 24 which extends outside of the cylinder and is connected at its outer end to the frame 16 by means of a pivot 25. The cylinder 18 is provided with a main inlet 26 by which pressure fluid flowing in the direction of the arrow in Fig. 1 for operating the piston 19 is admitted between the partition wall 22 and the piston 19. Since this flow is unrestricted, the piston 19 moves rapidly to its extended position thus rocking the shaft 3 clockwise to a position in which the roller 1 is in engagement with, or close to position to engage, the outer periphery of the drum D. The cylinder 18 is provided with a port 27 which is spaced from the partition wall 22 and in inoperative position of the rollers 1 and 2 is covered and blocked by the piston 19. Upon movement of the piston 19 to position the rollers in initial operating position the piston moves away from wall 22 beyond the port 27 so that pressure fluid from between the piston 19 and wall 22 may pass out through the port 27. A conduit 28 leads from the port 27 to a duct 29 in the wall 22 and the duct 29 in turn opens into the cylinder between the wall 22 and piston 23. Thus, after the piston 19 has moved the rollers into initial operating position pressure fluid is thereupon admitted between the wall 22 and piston 23 thus moving the piston 23 downwardly in Fig. 2 while maintaining the pressure between the piston 19 and wall 22. Thereupon the cylinder and the piston 19 move together and rock the shaft 3 additionally in the same direction from the initial position of the rollers to the final position. Since it is desirable that this movement of the rollers from initial to final position be slower than the rate of movement from idle to initial position a suitable throttling valve 30 is operatively interposed between the port 27 and the duct 29. This may be installed most conveniently in the line 28 and may be in the form of a needle valve so that it can be adjusted readily for different rates of movement. In Fig. 2 the conduit 28 with valve 30 has been broken away, the arrows showing the path of flow of the pressure fluid from the port 27 through valve 30 to the duct 29. A suitable bleeder line 31 (see Fig. 1) is provided for discharging the leakage fluid trapped between the pistons and the ends of the cylinder. Upon exhausting the working fluid from the cylinder, the device may return by gravity to its idle or starting position. The admission of fluid to the cylinder may be controlled by any suitable hand valve or if desired by a suitable solenoid valve controlled by the usual timing means so that the ply turn down operation is performed in the proper sequence relative to other tire building operations.

Thus having described our invention, we claim:

1. An underply turn down device comprising a support movable to an initial position and to a final position, ply turn down elements carried thereby, one of said elements being rendered initially operative when the support is moved to the initial position and the other element being rendered operative by movement of the support from initial to final position, a fluid pressure cylinder, having two separate chambers, a positioning piston in one chamber, a second piston in the other chamber coaxial with the positioning piston and said pistons having piston rods extending out of opposite ends of the cylinder, respectively, means connecting one of the rods to the support, means connecting the other rod to a fixed external abutment, said cylinder having a port for admitting pressure fluid to the chamber of the positioning piston, duct means connecting the chamber of the positioning piston to the other chamber, and said duct means having a port normally closed by the positioning piston and opened upon movement of the positioning piston to a position in which the support is moved thereby to initial position.

2. A device according to claim 1 characterized in that throttling means for fluid are operatively interposed between the chambers.

3. An underply turn down device adapted to turn down ply stock which is wrapped around a rotary tire building drum and which axially overhangs one end of the drum, comprising a support adapted to be moved laterally toward and away from the drum, turn down and hold down elements carried by said support in side by side relation and for similar movement and adapted when moved toward the drum to respectively engage the overhanging end of the ply stock thereon and to press the adjacent portion of the stock against the periphery of the drum, and means affording movement of said turn down element independently of said hold down element whereby said turn down element may be moved across the end of the drum to turn down the overhanging end of the stock while the adjacent portion of the stock is held against the drum by said hold down element.

4. The structure according to claim 3 further characterized in that said means comprises a resilient lost-motion connection between said hold down element and said support.

5. The structure according to claim 3 further characterized in that said turn down and hold down elements are disposed to engage circumferentially aligned portions of the stock whereby the stock adjacent the overhanging portion adapted to be operated upon by said turn down element is precluded from wrinkling.

6. An underply turn down device adapted to turn down ply stock which is wrapped around a rotary tire building drum and which axially overhangs one end of the drum, comprising a rock shaft parallel to the axis of said drum, means to rock said shaft, turn down and hold down elements carried by said shaft in side by side relation offset radially of the axis of said shaft and in position to respectively engage the overhanging end of the stock and to press the adjacent portion of the stock against the periphery of the drum, said turn down element being disposed to move across one end of the drum upon rocking of said shaft to thereby turn down the overhanging end of the stock, and means affording movement of said turn down element independently of said hold down element whereby said turn down element may be moved across the end of the drum to turn down the overhanging end of the stock while the adjacent portion of the stock is held against the drum by said hold down element.

7. The structure according to claim 6 further characterized in that said means comprises radially extending arms on said shaft respectively carrying said turn down and hold down elements and respectively fixed and swingable on said shaft, and a resilient lost-motion connection between said swingable arm and shaft whereby rocking of said shaft will move said turn down element through said fixed arm across the end of the drum to turn down the overhanging end of the stock while said hold down element presses the adjacent portion of the stock against the periphery of the drum.

8. The structure according to claim 6 further characterized in that said resilient lost-motion connection comprises fixed abutments on said swingable arm and on said shaft, and a spring compressed between such abutments.

9. In a ply turn down device, the combination of a movable support, turn down and hold down elements carried by said support, a positioning piston and cylinder assembly connected to the support and operative to relatively rapidly move the support to a predetermined position, a second piston and cylinder assembly also connected to said support and rendered operative upon predetermined movement of the piston of the positioning piston and cylinder assembly, said assemblies being provided with a relatively small passageway therebetween which is opened upon such predetermined movement of the piston of the positioning piston and cylinder assembly whereby said second piston and cylinder assembly operates more slowly than said positioning cylinder and assembly.

10. The combination with a rotatable tire forming drum adapted to support ply material peripherally with the ply material extending in overhanging relation to the end of the drum, a ply hold down element, a ply turn down element, said elements being disposed in side by side relation and circumferentially aligned with respect to the drum, movable supporting means supporting the elements for movement generally radially of the drum into a position in which the hold down element engages peripherally the ply material adjacent the end of the drum and the turn down element engages the overhanging ply material closely adjacent the end of the drum, a lost-motion connection between the hold down element and the movable supporting means, means to move the movable supporting means in one direction to place the elements in such position, means to move the supporting means farther in such direction, and means to return the supporting means to starting position.

11. In a tire building machine including a rotatable tire forming drum adapted to support ply material peripherally with the ply material extending in overhanging relation to the end of the drum, a ply hold down element, a ply turn down element, said elements being disposed in side by side relation and circumferentially aligned with respect to said drum, movable supporting means supporting the elements for movement thereby generally radially of the drum into a position in which the hold down element engages peripherally the ply material adjacent the end of the drum and the turn down element engages the overhanging ply material closely adjacent the end of the drum substantially at the same angular position about the drum axis as the line of engagement of the hold down element with the material on the drum, and operating means to move the movable supporting means.

12. An underply turn down device comprising a movable support, a turn down element fixedly carried by said support, a hold down element disposed alongside and in alignment with said turn down element and movably carried by said support for movement to a position out of alignment with respect to said turn down element, means for moving said support, and thus said elements, along a path lateral of said elements, and resilient means interposed between said support and hold down element yieldably retaining said elements in a position alongside and in alignment with each other.

EDWIN E. MALLORY.
JOHN W. WHITE.

REFERENCES CITED

The following references are of record in the file of this patent:

UNITED STATES PATENTS

| Number | Name | Date |
| --- | --- | --- |
| 2,339,551 | Stevens | Jan. 18, 1944 |
| 2,381,379 | Stevens | Aug. 7, 1945 |
| 2,381,401 | Stevens | Aug. 7, 1945 |
| 2,394,318 | McChesney | Feb. 5, 1946 |